United States Patent [19]
Prince et al.

[11] 4,291,520
[45] Sep. 29, 1981

[54] VERTICAL FORM, FILL AND SEAL PACKAGING MACHINE WITH IMPROVED END SEALING AND STRIPPING MEANS

[75] Inventors: Clarence F. Prince, Springfield; Roger L. Putnam, Jr., East Longmeadow, both of Mass.

[73] Assignee: Package Machinery Company, East Longmeadow, Mass.

[21] Appl. No.: 107,136

[22] Filed: Dec. 26, 1979

[51] Int. Cl.³ .................. B65B 9/10; B65B 51/30
[52] U.S. Cl. ................................ 53/551; 53/373
[58] Field of Search ............ 53/551, 552, 550, 554, 53/555, 373

[56] References Cited
U.S. PATENT DOCUMENTS

| | | | |
|---|---|---|---|
| 3,027,695 | 4/1962 | Leasure | 53/552 X |
| 3,061,989 | 11/1962 | Newell et al. | 53/552 |
| 3,220,156 | 11/1965 | Hart et al. | 53/551 X |
| 3,256,673 | 6/1966 | Tew et al. | 53/551 |
| 3,685,250 | 8/1972 | Henry et al. | 53/551 |
| 4,040,237 | 8/1977 | O'Brien | 53/551 |

Primary Examiner—Horace M. Culver
Attorney, Agent, or Firm—McCormick, Paulding & Huber

[57] ABSTRACT

A vertical form, fill and seal packaging machine comprises a source of flexible packaging material, a tube former which receives the material and forms a depending upwardly open tube, a product dispenser above the former discharges measured quantities of product to the tube, a side sealer closes juxtaposed edges of the tube, a feeder draws the material through the former, and an improved end sealer and stripper has jaws which close horizontally about the tube to a partially closed position, a stripper means on the jaws clears and flattens the end seal area of the tube as the partially closed jaws are swung downwardly to an end sealing position, and the jaws thereafter close and seal the tube.

10 Claims, 4 Drawing Figures

VERTICAL FORM, FILL AND SEAL PACKAGING MACHINE WITH IMPROVED END SEALING AND STRIPPING MEANS

BACKGROUND OF THE INVENTION

This invention relates generally to machines for forming, filling and sealing packages from an elongated thin flat strip of flexible packaging material, the strip of material being first formed to a depending upwardly open tubular configuration, sealed longitudinally at overlapped vertically extending edge portions, sealed transversely along horizontal lines spaced vertically along the tube, and filled from above with measured quantities of product between successive transverse or end sealing operations. More particularly, the invention relates to an improved end sealing and stripping means in a machine of the type mentioned.

U.S. Pat. No. 3,027,695 entitled Method and Apparatus for Packaging, granted Apr. 3, 1962, illustrates and describes end sealing and stripping apparatus in a form, fill and seal packaging machine of the type which employs a movable tube former. That is, packaging material passes through a tube former adapted for vertical movement and which operates to move upwardly with end sealing jaws engaged with and securing a depending tube of packaging material against upward movement. The tube of packaging material beneath the former is thus elongated with the material passing through the former during its upward movement, a measured quantity of product is dispensed through the former into the tube, the former is then moved downwardly with the tube depending therefrom in a filled condition, and the end sealing jaws are engaged with the tube above the product with stripper means mounted on the jaws. A subsequent short upward movement of the former results in a "stripping" operation wherein the tube is cleared internally and flattened prior to full engagement of the sealing jaws and the completion of the end sealing operation and package formation.

The apparatus described is well suited to the movable tube former type packaging machine but is unsuited to the type of form, fill and seal packaging machine which employs a stationary tube former with independent tube feeding means therebeneath for drawing the strip of packaging material through the former and for thus forming the necessary depending tube of packaging material. Further, with the tube of material in tension between end sealing jaws and a movable tube former, the portion of the tube immediately above the jaws may be drawn into a relatively sharp or tight "V" configuration and such configuration is not conducive to an efficient filling operation, nor is the resulting stress on the tube of packaging materials at the end sealing jaws conducive to good end sealing operation. A packaging machine with independent tube feeding means such as the vacuum-friction belts of U.S. Pat. No. 4,136,505 entitled Tubeless Vertical Form, Fill and Seal Packaging Machine with Improved Feed Means, Jan. 30, 1979, avoids tensioning the packaging material between the former and the end sealing jaws and this is conducive to an efficient product dispensing or filling operation.

From the foregoing it will be apparent that an efficient stripping and end sealing operation should include a squeezing or flattening operation on the tube across an area above the end sealing zone and a smooth downward progression of the flattening operation to the end sealing zone resulting in clearing of the interior of the tube of product or product particles such as potato chips, and the preliminary flattening of the tube for efficient end sealing on full closing of the end sealing jaws. It is a general object of the present invention to provide such a stripping operation in combination with a highly efficient end sealing operation in the type of form, fill and seal package machine which employes an independent feed means such as a vacuum-friction belt and which avoids tensioning of the tube of packaging material between the tube former and the end sealing jaws.

SUMMARY OF THE INVENTION

In fulfillment of the foregoing object, a vertical form, fill and seal packaging machine is provided with a source of flexible packaging material in the form of an elongated thin flat strip of material of uniform width and which comprises successive flat package blanks as integral longitudinally contiguous sections thereof. A tube former receives the strip of material and progressively forms the same in passage therethrough to a depending and upwardly open tubular configuration with opposite longitudinal edge portions of the material being progressively juxtaposed so as to extend vertically and in parallel relationship. A product dispensing means above the tube former provides for the gravity discharge of measured quantities of product through the former and into the interior of the depending tube of packaging material through its aforesaid upwardly open end. A side sealing means disposed beneath the tube former engages and seals together the juxtaposed vertically entending longitudinal edge portions of the tube. A tube feed means is disposed beneath the tube former with the latter held stationary and is operable intermittently to draw the packaging material through the former and thus successively to present integral tubular package blanks therebeneath for filling, sealing and package formation. The operation of the tube feed means and associated end sealer can thus be coordinated to provide a generally "U" shaped configuration of the tube above the end sealer and thus avoid the sharp "V" configuration and taut condition of the tube detrimental to efficient product filling operations.

An improved end sealer and stripper apparatus mounted beneath the tube feed means has a mounting frame and front and rear sealing jaws relatively movable generally horizontally between open and closed positions. Operating mechanisms on the frame for effecting generally horizontal jaw movement between open and closed positions is also adapted to provide an intermediate partially closed position where the jaws oppositely engage and compress but do not fully close and seal a tube of packaging material there-between. Stripper means mounted on and movable with the front and rear jaws oppositely engage and substantially fully close the tube of packaging material when the jaws are in their said intermediate position. A power operated means associated with the frame moves the same together with the operating mechanism, sealing jaws, and stripper means with the latter in said intermediate position, the said means serving to effect a generally vertically downward movement of the jaws and stripper means relative to the tube of packaging material whereby to clear the tube internally and to flatten the same for efficient end sealing by the front and rear jaws in their subsequent fully closed position.

Preferably, the mounting frame and the operating mechanism etc. carried thereby is supported for pivotal movement causing the front and rear jaws to traverse a shallow arc which lies generally in a vertical plane approximately at the center line of said depending tube of packaging material. Thus, the means for moving the mounting frame may be operable in one and an opposite direction to pivot the frame and thus cause the sealing jaws to move generally vertically along said shallow arc between upper and lower positions. The lower position is the sealing position where the jaws are fully closed and the upper position represents the start position for the stripping action of the stripper means on the jaws with the jaws at their intermediate position. A stripper means on at least one of the jaws is preferably spring biased so as to be urged forwardly toward the tube center line during its stripping action and to retract into alignment with the face of its associated jaw when the jaws are moved to their fully closed and sealing position.

Fluid cylinder means are preferably employed for operating the sealing jaws and for swinging the mounting frame upwardly and downwardly for the stripping action, the particular sealing jaw and operating mechanism employed serving to provide a highly efficient end sealing operation. A toggle action in closing motion of the jaws results in the availability of a high clamping force between the jaws and causes the jaws to close smoothly with little or no bouncing or impact. As illustrated and described hereinbelow, the sealing jaw and operating mechanism is of the type disclosed in U.S. Pat. No. 4,040,237 entitled Sealing Jaw Mechanism for Package Making Machine, issued Aug. 9, 1977. Reference may be had to the patent for detailed illustration and explanation of the jaw and mechanism construction.

DESCRIPTION OF PREFERRED EMBODIMENT

Figure 1:
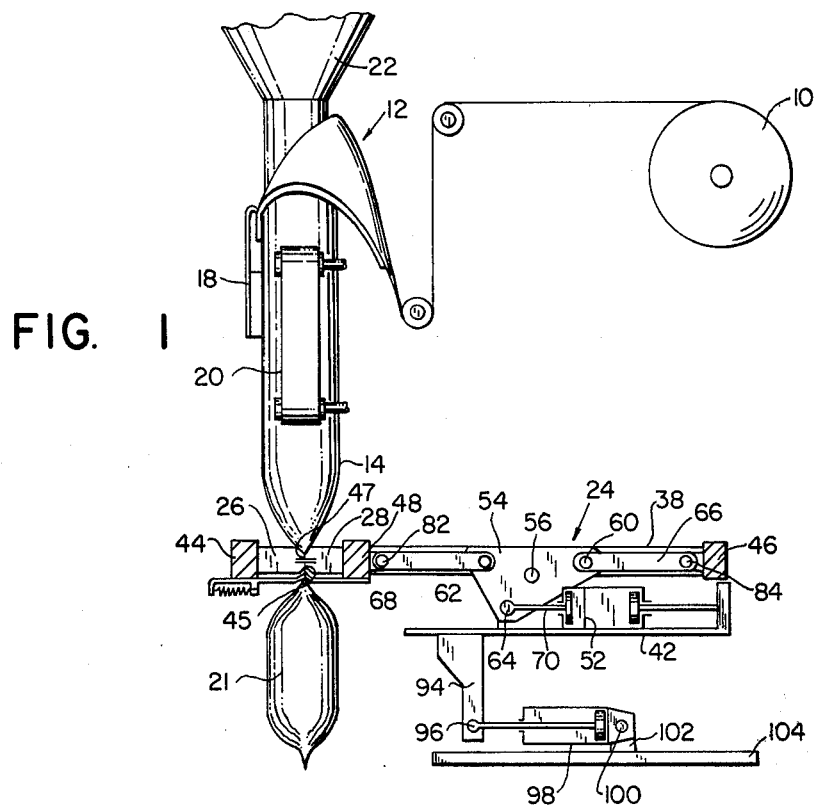
FIG. 1 is a schematic illustration of a form, fill and seal packaging machine including the improved end sealer and stripper of the present invention and showing front and rear end sealing jaws in their fully closed and sealing position.

Referring to FIGS. 1-4, a vertical form, fill and seal packaging machine employes a thin flat strip of flexible packaging material supplied from a source 10 and guided to a tube former 12 at the upper end of the machine. In passage through the tube former 12 the flat strip of packaging material is formed to a depending and upwardly open tubular configuration with its longitudinal edges juxtaposed or overlapping one another. A longitudinal sealing mechanism 18, or side sealer, operates to seal the overlapped or juxtaposed longitudinal edges of tube 14 and may be of a continuous or intermittently operable type. The packaging material is drawn downwardly through the former 12 by a tube feed means which may be of the vacuum belt or vacuum-friction type illustrated in U.S. Pat. No. 4,136,505 mentioned above. As illustrated, a feed belt 20 cooperates with a similar feed belt located at a rear side of the tube 14 and operates intermittently to advance or draw the tube 14 downwardly through the former 12.

As packages such as 21 are formed by the machine, they are filled by a product dispensing means 22 disposed above the tube former for the gravity discharge of measured quantities of product through the former and into the interior of the upwardly opened tube. Coordinated cyclical or intermittent operation of the dispensing means is of course provided for so that the quantity or charge of product in each package is controlled as desired. The machine thus far described and the end sealer and stripper described hereinbelow are particularly suited to light weight product such as potato chips but are not so limited.

The improved end sealer and stripper is indicated generally at 24 and forms package end seals in the tube 14 by intermittently flattening the tube and heat sealing or otherwise joining the two layers of the flattened tube to one another through the use of two relatively movable jaws 26, 28. During a closing movement of the jaws 26 and 28, the sealing apparatus simultaneously forms the top end seal of a leading package such as 21 and the bottom end seal of the following package, and it also serves to sever the tube between the two seals to separate the leading package from the tube. Vertical movement of the tube 14 is of course terminated, by stopping the feed belts 20, 20 while the jaws 26, 28 are closed. Between successive operations of the jaws, the tube is advanced or drawn downwardly by the feed belts and a charge of product is loaded into the tube by the product dispenser 22.

The end sealing apparatus or mechanism 24 includes a slide reciprocal relative to the packaging machine along a horizontal axis and comprising two parallel rods 38, 38, one shown. A bracket or bearing block not shown slideably mounts the rods 38, 38 and is fixed to a base or frame 42. A front cross piece 44 is fixed to and moves with the slide rods 38, 38 as is a rear cross piece 46. The front cross piece 44 carries the front end sealing jaw 26 with its sealing base 45 facing rearwardly or toward the rear jaw 28. Intermediate cross piece 48 is slideable on the rods 38, 38 and carries the rear jaw 28 with its sealing face 47 facing forwardly or toward the front jaw 26.

The slide 38 and the intermediate cross piece 48 are driven simultaneously in opposite directions by a crank and link arrangement powered by fluid cylinder means in the form of a double acting hydraulic cylinder 52. Crank or crank means 54 is fixed to a crank shaft 56 oriented in a direction perpendicular to the axis of sliding movement of slide 38 and, as illustrated, is located on the same vertical level as slide 38 so that its axis intersects the longitudinal axis of the slide rods. Crank 54 carries three pivot pins providing pivot points 60, 62 and 64 and in effect provides three crank arms fixed to the crank shaft 56. The first crank arm extends from the crank shaft 56 to the first pivot point 60, the second from the crank shaft to the pivot point 62, and the third crank arm extends from the crank shaft to the pivot point 64.

A first connecting link 66 extends between the pivot point 60 and the rear cross piece 46, a second connecting link extends between the second pivot point 62 and the intermediate cross piece 48. Piston rod 70 of fluid cylinder 52 is connected to the crank at the pivot point 64.

Figure 2:
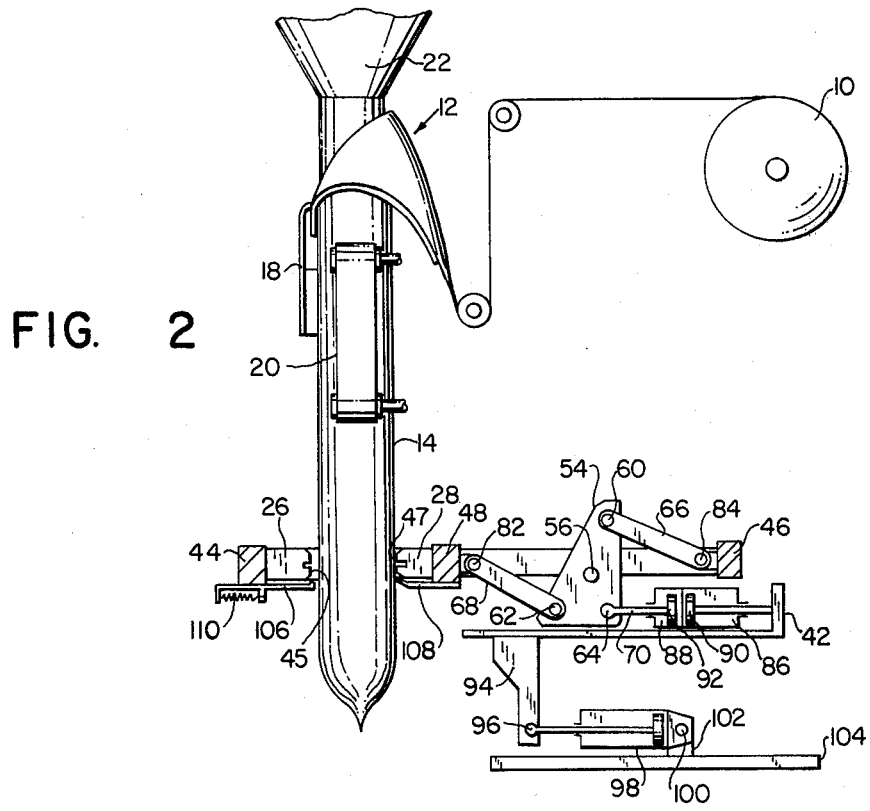
FIG. 2 is a schematic illustration similar to FIG. 1 but illustrates the end sealer and stripper apparatus with the sealing jaws in an open position with the tube of packaging material being fed downwardly therebetween subsequent to an end sealing operation.

Operation of the crank and link mechanism in moving the end sealing jaws between open and closed positions is best understood with reference to FIGS. 1 and 2. In FIG. 2 the front and rear jaws 26, 28 are shown in their open position. From this position, the jaws may be moved to their closed position as in FIG. 1 by operating the cylinder 52 to extend the rod 70 and to rotate the crank 54 in a clockwise direction. That is, as crank 54 is rotated in a clockwise direction, connecting link 66 drives slide 38 to the right and connecting link 68 drives the intermediate cross piece 48 to the left to move the jaws 26 and 28 toward one another. In the fully closed position of FIG. 1, it will be note that the axis of crank shaft 56, the two pivot points 60, 62, pivot point 82 at which link 68 is connected to intermediate cross piece 48, and pivot point 84 at which link 66 is connected to the slide are all located along a common horizontal line. Thus, it will be apparent that as jaws 26, 28 move to their closed position, the linkage which drives the jaws has a toggle action. This caused the velocity of each jaw to approach 0 as it reaches its fully closed position and thereby yields a smooth closing action of the jaws with little or no bounce or impact. Also with the pivot axes in alignment during the closed position of the jaws, forces tending to open the jaws are reacted by forces passing through crank axis 56 and, therefore, have no moment arm tending to rotate the crank. Thus, cylinder 52 need exert only relatively little force to hold the jaws closed against much larger forces tending to open the same. A reverse procedure is of course followed in opening the jaws.

Figure 4:
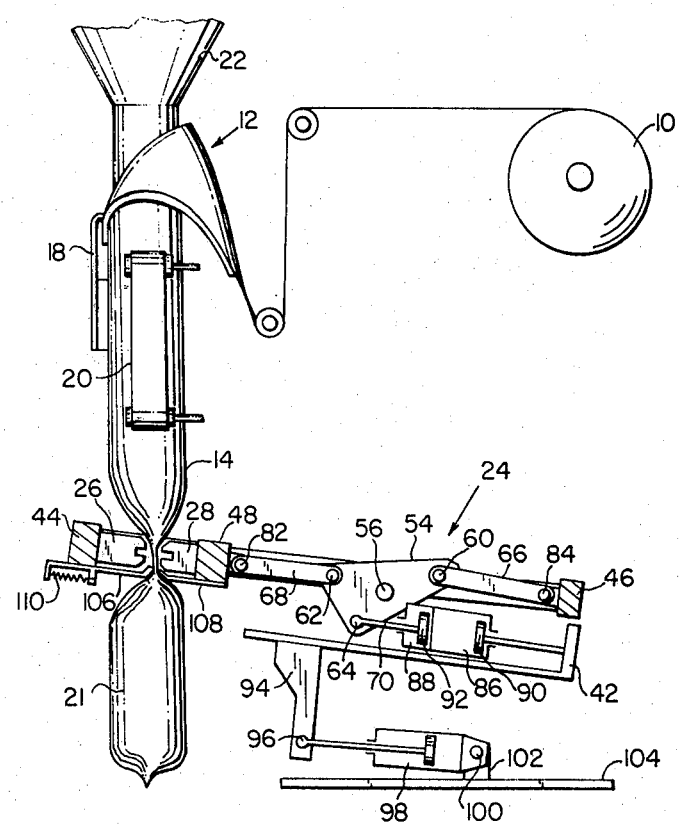
FIG. 4 is a schematic illustration similar to FIGS. 1-3 but shows the end sealing jaws and stripper means at the start position with the end sealing jaws in their intermediate position and the stripper means operatively engaged with the tube of packaging material.

In accordance with the present invention, the jaws 26, 28 are also provided with the ability to assume an intermediate position where they are partially closed and where they oppositely engage and compress but do not fully close and seal the tube of packaging material therebetween. The cylinder 52 is provided with first and second chambers 86, 88 and with first and second pistons 90, 92, the latter being connected with the rod 70. Thus, on movement of the piston 90 rightwardly and under the urging of fluid pressure, the jaws 26, 28 assume an intermediate position as illustrated in FIG. 4, the piston 92 remaining in its right-hand position as shown. On the application of fluid pressure to the face of piston 92 and on leftward movement thereof as illustrated in FIG. 1, the jaws 26, 28 assume their fully closed and sealing position. The intermediate position of the jaws 26, 28 is employed in a stripping operation as described hereinbelow.

Further in accord with the invention, the base or frame 42 is mounted for pivotal or swinging action and may be mounted on an axis coincident with that of the crank arm 56. Attached to the base is a bracket 94 which extends downwardly and is pivotally attached at 96 to the rod of the fluid cylinder means comprising cylinder 98 pivotally mounted at a rear end portion 100 to a bracket 102 in turn fixed to a stationary frame 104. As will be apparent, the fluid cylinder 98 can be operated to swing the frame 42, the operating mechanism thereon and the jaws 26, 28 in one and an opposite direction or upwardly and downwardly whereby to cause the jaws to traverse a shallow arc lying substantially in a vertical plane at the center line of the tube 14. With the fluid cylinder 98 operated as illustrated in FIG. 3 to swing the base or frame 42 in a clockwise direction raising the jaws 26, 28 as illustrated, the jaws are in an upper or start position for a stripping operation.

Stripper means on the jaws 26, 28 comrprise first and second or front and rear stripper plates 106, 108 respectively mounted on the jaws. The stripper plate 106 is spring biased by a small spring 110 so as to be urged rearwardly or toward the center line of the tube 14, and conversely to retract into alignment with the face 45 of the jaw 26 when the jaws 26, 28 are in their fully closed position. As shown, and as presently preferred, the stripper plate 108 is fixedly mounted on the rear jaw 28 with its forward edge lying approximately in alignment with the face 47 of the jaw.

Figure 3:
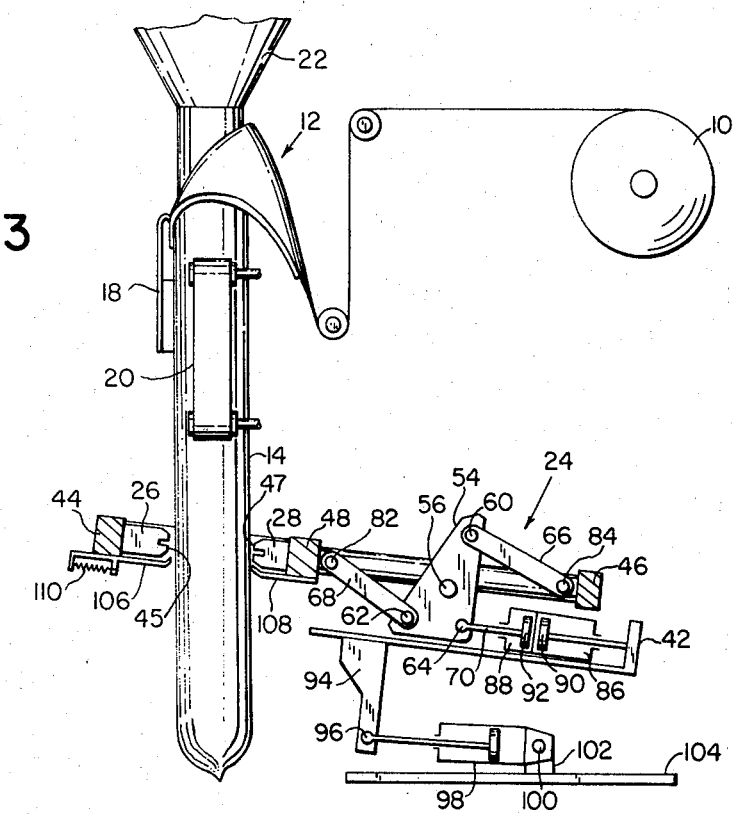
FIG. 3 is a schematic illustration similar to FIGS. 1 and 2 but shows the end sealing jaws and stripper means swung upwardly to a start position for stripping, but with the end sealing jaws in their open position.

When the tube 40 in FIG. 3 has been filled with product such as potato chips, and with the jaws 26, 28 in the upper or start position as illustrated, the piston 90 may be moved rearwardly in cylinder 52 to bring the jaws 26, 28 to their intermediate or partially closed position for a stripping operation. Thereafter, with the piston in the cylinder 98 moving rightwardly from the FIG. 3 and 4 positions to the FIG. 1 position, the jaws 26, 28 and the stripper plates 106, 108 are swung downwardly with the spring 110 urging the stripper plate 106 toward the center line of the tube whereby to flatten the tube and clear the interior of the tube of potato chips, fragments thereof etc. On arrival of the jaws 26, 28 and the stripper plates 106, 108 at the lower or end sealing position of FIG. 1, the piston 92 in the cylinder 52 is urged leftwardly as illustrated in FIG. 1 and the jaws are moved to the fully closed and sealing position of FIG. 1.

As will be apparent the foregoing operations are coordinated and timed to provide the stripping action prior to the end sealing operation so that a cleared and flattened tube is presented for efficient end sealing. The operation of the end sealer is highly efficient as described above and, in combination with the stripping action, a highly efficient stripping and end sealing operation results in a packaging machine of the stationary former type.

We claim:

1. In a vertical form, fill and seal packaging machine comprising a source of flexible packaging material in the form of an elongated thin flat strip of material of uniform width and comprising successive flat package blanks as integral longitudinally contiguous sections thereof, a tube former adapted to receive said strip material and progressively form the same in passage therethrough to a depending and upwardly open tubular configuration, opposite longitudinal edge portions of the material being progressively juxtaposed in passage through said former so as to extend vertically and in parallel relationship, product dispensing means above said tube former for the gravity discharge of measured quantities of product through the former and into the interior of said depending tube of packaging material through its said upwardly open end, side sealing means disposed beneath said tube former for sealing said juxtaposed vertically extending longitudinal edge portions of the tube, vacuum belt tube feed means beneath the tube former operable intermittently to draw the packaging material through the former and thus successively to present integral tubular package blanks therebeneath for filling, sealing and package formation; the improvement comprising a package end sealer and stripping apparatus having a mounting frame and front and rear sealing jaws relatively movable generally horizontally between an open position and a vertically fixed closed position, operating mechanism on said frame for effecting generally horizontal jaw movement between said open and closed positions and an intermediate partially closed position where the jaws oppositely engage and compress but do not fully close and seal a tube of packaging material therebetween, stripper means mounted on and movable with said jaws to oppositely engage and substantially fully close the tube of packaging material when the jaws are in their intermediate position, and means associated with said frame for moving the same together with said operating mechanism, sealing jaws, and stripper means with the latter in said intermediate position, said means serving to effect a generally vertically downward movement of said jaws and stripper means relative to said tube of packaging material whereby to clear the tube internally and to flatten the same for efficient end sealing by said front and rear jaws in subsequent fully closed and vertically fixed position of the jaws and with the feed means inoperative, said mounting frame for said sealing jaws and operating mechanism being supported for pivotal movement causing said front and rear jaws to traverse a shallow arc lying generally in a vertical plane approximately at the center of said depending tube of packaging material, and said means for moving the mounting frame being operable in one and an opposite direction to pivot the frame causing the sealing jaws to move generally vertically along said shallow arc between upper and lower positions, said lower position being the sealing position of the jaws and said upper position representing the start position for the stripping action of the stripper means on the jaws at the intermediate jaw position.

2. The improvement in a vertical form, fill and seal packaging machine as set forth in claim 1 wherein said means for moving said mounting frame takes the form of a fluid cylinder and an associated connecting device for swinging the frame in one and an opposite direction to effect jaw movement between said upper and lower positions.

3. The improvement in a vertical form, fill and seal packaging machine as set forth in claim 1 wherein at least one of said stripper means is slidably mounted on its associated jaw and spring biased toward the adjacent tube of packaging material so as to project slightly beyond the inner jaw surface with the jaws in their intermediate position, the stripper means thus engaging the tube and performing its stripping function during downward jaw movement and being urged against its spring bias to a position of approximate alignment with the jaw inner surface when the sealing jaws are in their closed and sealing position.

4. The improvement in a vertical form, fill and seal packaging machine as set forth in claim 3 wherein the stripper means mounted on the jaw opposite said spring biased stripper means has its forward end portion in approximate alignment with the inner surface of the adjacent jaw.

5. The improvement in a vertical form, fill and seal packaging machine as set forth in claim 2 wherein said operating mechanism for said front and rear sealing jaws comprises a base, a slide supported for movement relative to said base along a given axis, means fixing said front jaw to said slide for movement therewith, means slidably supporting said rear jaw for movement relative to the slide along said given axis, said slide extending along said given axis from said front jaw toward and beyond said rear jaw to a point behind said rear jaw, crank arm means supported for pivotal movement about an axis generally perpendicular to said given axis and located behind said rear jaw, and connecting means between said crank arm means and said slide with its point of connection to the slide being located behind said rear jaw, said connecting means also interconnecting the crank arm means and said supporting means for said rear jaw, and said crank arm means on rotation about its axis serving to move said two jaws slidably in opposite directions along said given axis.

6. The improvement in a vertical form, fill and seal packaging machine as set forth in claim 5 wherein said connecting means comprises a first connecting link connected between said crank arm means and said slide with its point of connection to said slide being located behind said rear jaw, and a second connecting link connected between the crank arm means and said supporting means for said rear jaw, the point at which said first connecting link is connected to said crank arm means and the point at which said second connecting link is connected to said crank arm means being located generally on opposite sides of said crank axis.

7. The improvement in a vertical form, fill and seal packaging machine as set forth in claim 6 wherein the point at which said first connecting link is connected to said slide and the point at which said second connecting link is connected to said supporting means for said rear jaw are located on opposite sides of said crank axis.

8. The improvement in a vertical form, fill and seal packaging machine as set forth in claim 7 wherein said crank axis, said point at which said first connecting link is connected to said crank arm means, said point at which said first connecting link is connected to said slide, said point at which said second connecting link is connected to said crank arm means, and said point at which said second connecting link is connected to said supporting means for said other jaw are all located at least substantially on a common straight line when said jaws are in their closed position.

9. The improvement in a vertical form, fill and seal packaging machine as set forth in claim 8 wherein said crank axis intersects said given axis.

10. The improvement in a vertical form, fill and seal packaging machine as set forth in claim 9 wherein said operating mechanism also includes fluid cylinder means operatively connected with said crank arm means for rotating the same about its axis in one and an opposite direction, said fluid cylinder means having a first condition wherein said crank arm means moves said front and rear jaws to their open position, a second condition wherein said crank arm means moves said jaws to their intermediate position, and a third condition wherein said crank arm means moves said jaws to their closed and sealing position.

* * * * *